United States Patent
Agiwal et al.

(10) Patent No.: US 12,034,671 B2
(45) Date of Patent: *Jul. 9, 2024

(54) METHOD AND SYSTEM FOR TRANSMITTING AND RECEIVING PROTOCOL DATA UNIT IN COMMUNICATION NETWORKS

(71) Applicant: Samsung Electronics Co., Ltd., Suwon-si (KR)

(72) Inventors: Anil Agiwal, Bangalore (IN); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,673

(22) Filed: Apr. 26, 2023

(65) Prior Publication Data

US 2023/0261842 A1 Aug. 17, 2023

Related U.S. Application Data

(63) Continuation of application No. 17/444,520, filed on Aug. 5, 2021, now Pat. No. 11,664,949, which is a (Continued)

(30) Foreign Application Priority Data

Oct. 22, 2014 (IN) .......................... 5275/CHE/2014
Sep. 30, 2015 (IN) .......................... 5275/CHE/2014

(51) Int. Cl.
*H04L 5/00* (2006.01)
*H04B 7/0413* (2017.01)
(Continued)

(52) U.S. Cl.
CPC ......... *H04L 5/0053* (2013.01); *H04B 7/0413* (2013.01); *H04W 4/18* (2013.01);
(Continued)

(58) Field of Classification Search
None
See application file for complete search history.

(56) References Cited

U.S. PATENT DOCUMENTS 8,199,757 B2 7/2012 Pani et al.
8,750,333 B2 6/2014 Susitaival et al.
(Continued)

FOREIGN PATENT DOCUMENTS

CN 101810026 A 8/2010
CN 102301672 A 12/2011
(Continued)

OTHER PUBLICATIONS

International Search Report dated Feb. 1, 2016 in connection with International Application No. PCT/KR2015/011204, pages.
(Continued)

*Primary Examiner* — Saad Khawar (57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method and system for managing data transmission in a communication network is provided. During Data Resource Bearer (DRB) creation, network signals to a transmitting node, the data transfer requirement. The network uses a signaling parameter to indicate a large data transfer requirement. Based on the data transfer requirement information collected from the network, the transmitting node determines the type of data format that needs to be used for the data transmission. If the network signals large data transfer requirement,
(Continued)

then the transmitting node selects a Subheader format in which the length field of the data format suits the large data transfer requirement. Further, data communication is initiated using the selected Subheader format.

12 Claims, 8 Drawing Sheets

Related U.S. Application Data continuation of application No. 16/031,969, filed on Jul. 10, 2018, now Pat. No. 11,121,841, which is a continuation of application No. 14/920,827, filed on Oct. 22, 2015, now Pat. No. 10,057,033.

(51) Int. Cl.
<br>    *H04B 7/06*          (2006.01)
<br>    *H04W 4/18*        (2009.01)
<br>    *H04W 28/06*      (2009.01)

(52) U.S. Cl.
<br>    CPC ......... *H04W 28/06* (2013.01); *H04W 28/065* (2013.01); *H04B 7/0617* (2013.01)

(56) References Cited

U.S. PATENT DOCUMENTS

| | | | |
|---|---|---|---|
| 10,057,033 | B2 | 8/2018 | Agiwal et al. |
| 11,121,841 | B2* | 9/2021 | Agiwal ................ H04L 5/0053 |
| 2005/0265390 | A1 | 12/2005 | Lee et al. |
| 2008/0123620 | A1 | 5/2008 | Ko et al. |
| 2009/0092076 | A1 | 4/2009 | Zheng et al. |
| 2009/0141670 | A1 | 6/2009 | Duncan Ho |
| 2010/0159822 | A1 | 6/2010 | Lim et al. |
| 2010/0238931 | A1 | 9/2010 | Meyer et al. |
| 2011/0007753 | A1 | 1/2011 | Agiwal et al. |
| 2011/0080873 | A1 | 4/2011 | Zhang et al. |
| 2011/0205945 | A1 | 8/2011 | Cave et al. |
| 2012/0014366 | A1* | 1/2012 | Kim .................... H04W 28/065 370/338 |
| 2012/0163378 | A1 | 6/2012 | Kim et al. |
| 2013/0039273 | A1 | 2/2013 | Lee et al. |
| 2013/0044698 | A1 | 2/2013 | Susitaival et al. |
| 2015/0163695 | A1 | 6/2015 | Li et al. |

FOREIGN PATENT DOCUMENTS

| | | | |
|---|---|---|---|
| CN | 102598624 | A | 7/2012 |
| CN | 102835150 | A | 12/2012 |
| CN | 103460751 | A | 12/2013 |
| CN | 103929780 | A | 7/2014 |
| EP | 1921807 | A1 | 5/2008 |
| EP | 2094038 | A1 | 8/2009 |
| WO | 2010107708 | A2 | 9/2010 |
| WO | 2014/026370 | A1 | 2/2014 |

OTHER PUBLICATIONS

Written Opinion of the International Searching Authority dated Feb. 1, 2016 in connection with International Application No. PCT/KR2015/011204, 6 pages.
Extended European Search Report regarding Application No. 15852073.4, dated Jan. 23, 2018, 8 pages.
Office Action dated Jun. 25, 2019 in connection with Chinese Patent Application No. 201580052323.8, 22 pages.
Intel Corporation et al., "Corrections to RAN5 Test case 7.1.4.10 on MAC padding", 3GPP TSG-RAN WG2 Meeting #79bis, Oct. 8-12, 2021, R2-124978, 7 pages.
Office Action dated Jun. 22, 2021 in connection with Chinese Patent Application No. 202010372166.1, 14 pages.
European Search Report dated Sep. 6, 2022 in connection with European Patent Application No. 22 15 9254, 5 pages.

* cited by examiner

METHOD AND SYSTEM FOR TRANSMITTING AND RECEIVING PROTOCOL DATA UNIT IN COMMUNICATION NETWORKS

CROSS-REFERENCE TO RELATED APPLICATIONS

The present application is a continuation of application Ser. No. 17/444,520 filed Aug. 5, 2021, which is a continuation of application Ser. No. 16/031,969, filed on Jul. 10, 2018, now U.S. Pat. No. 11,121,841 issued Sep. 14, 2021, which is a continuation of application Ser. No. 14/920,827, filed on Oct. 22, 2015, now U.S. Pat. No. 10,057,033 issued Aug. 21, 2018, which is based on and claims priority under 35 U.S.C. 119(a) to Indian patent provisional application Serial No. 5275/CHE/2014 filed in the Indian Intellectual Property Office on Oct. 22, 2014 and Indian patent complete application Serial No. 5275/CHE/2014 filed in the Indian Intellectual Property Office on Sep. 30, 2015, the contents of which are incorporated herein by reference.

BACKGROUND

1. Field

The embodiments herein relate to wireless communication networks and, more particularly, to transmitting and receiving protocol data unit between a User Equipment (UE) and Base Station (BS) in the wireless communication networks.

2. Description of Related Art

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SOMA) as an advanced access technology have been developed.

In existing communication networks, comprising user equipment (UE), enhanced node B (eNB), serving gateway (S-GW) and packet data node gateway (PDN-GW), the incoming data via any of several protocols, such as IP, TCP and so on, are converted to blocks of data that can be transported by the Physical layer, by intermediate layers, namely PDCP (Packet Data Convergence Protocol), RLC (Radio Link Control) and MAC (Medium Access Control). These layers provide several functions such as multiplexing, parsing, unpacking, reassembly functions among others.

Any data received by an LTE network is converted to transport blocks by the various layers present in the LTE network in order for the data to be transported by the physical layers. Data transported between various levels come in different sized blocks. Each transport layer communicates the size of each block transported to the next layer and the penultimate layer. The MAC layer generates the MAC Protocol Data Unit (PDU) carrying one or more data blocks (or MAC Service Data Units). The MAC layer adds a MAC subheader for each of the MAC SDU in MAC PDU. The size of MAC SDU is indicated in length field of MAC subheader wherein the length field is either 7 bits or 15 bits. Format bit field in the MAC subheader indicates whether length field is 7 bit or 15 bits. The maximum size of MAC SDU that can be indicated using the current MAC subheader is 32767 octets or bytes.

However, the 15-bit field indicating the size of each transport block is insufficient to indicate the size of any data greater than 32767 octets. For emerging communication technologies such as aggregation of large number of carriers or usage of carriers of larger bandwidth to support high data rate, the size of the length field is insufficient to indicate size of the data blocks being transported from any transmitter to a receiver and vice versa. Since the current communication technologies are already deployed with this limitation a backward compatible solution is needed to support larger MAC SDU sizes. Two MAC subheaders can be defined wherein one MAC subheader has a shorter length field and another MAC subheader has longer length field. Network indicates in signaling whether to use first header or second subheader. The disadvantage of this method is that once the network indicates to use header with large length field then irrespective of size of MAC SDU this subheader needs to be used. This leads to unnecessary overhead in each MAC PDU for shorter size MAC SDU.

SUMMARY

To address the above-discussed deficiencies, it is a primary object of the embodiments herein is to transmit and receive Protocol Data Unit (PDU) between a transmitting node and a receiving node in a communication network.

In view of the foregoing, a first embodiment herein provides a method for data transmission in a communication network. Initially, a length of MAC SDU to be transmitted is determined by a transmitting node of said communication network. The transmitting node further decides whether said length of MAC SDU is less than a threshold. If the length of MAC SDU is less than the threshold, then the transmitting node encodes the length of MAC SDU in a first MAC subheader format. If the length of said MAC SDU is not less than the threshold, then the transmitting node determines whether a large MAC SDU is configured or not. The transmitting node encodes the length of MAC SDU in a second MAC subheader format, if said large MAC SDU is configured and if said length of MAC SDU is not less than said threshold. The transmitting node encodes the length of MAC SDU in a third MAC subheader format, if said large MAC SDU is not configured and if said length of MAC SDU is not less than said threshold. Further, the MAC SDU is transmitted with the MAC subheader, to a receiving node of said communication network, by said transmitting node.

In a second embodiment, a system for data transmission in a communication network is provided. A transmitting node in the system determines a length of MAC SDU to be transmitted, and then determines whether said length of MAC SDU is less than a threshold. If the length of MAC SDU is lesser than said threshold, then the transmitting node encodes the length of MAC SDU in a first MAC subheader format. If the length of MAC SDU is not less than the threshold, then the transmitting node determines whether a large MAC SDU is configured. If said large MAC SDU is configured and if said length of MAC SDU is not less than said threshold, the transmitting node encodes the length of MAC SDU in a second MAC subheader format. If said large MAC SDU is not configured and if said length of MAC SDU is not less than said threshold, then the transmitting node encodes the length of MAC SDU in a third subheader format. Further, the transmitting node transmits the MAC SDU with said MAC subheader, to a receiving node of said communication network.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 4H, discussed below and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein are practiced and to further enable those of skill in the art to practice the embodiments herein. Accordingly, the examples should not be construed as limiting the scope of the embodiments herein.

The embodiments herein disclose a mechanism for transmitting and receiving protocol data unit between a transmitting node and a receiving node in a communication network. Referring now to the drawings, and more particularly to FIGS. 1 through 4H, where similar reference characters denote corresponding features consistently throughout the figures, there are shown embodiments.

Figure 1:
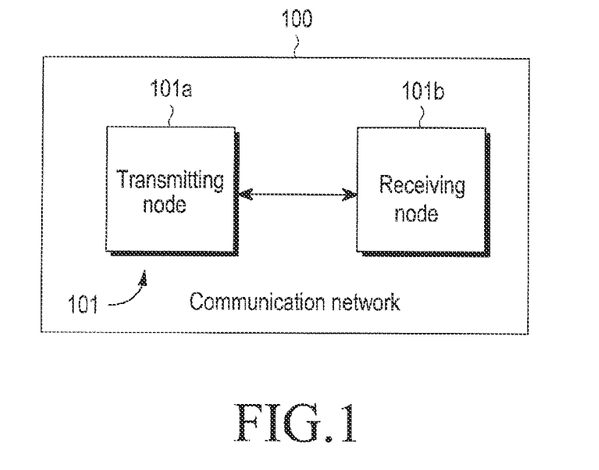
FIG. 1 illustrates a block diagram of an example communication network according to this disclosure.

FIG. 1 illustrates a block diagram of an example communication network according to this disclosure. The communication network (network) 100 comprises of at least one transmitting node 101*a* and at least one receiving node 101*b*. In an embodiment, the transmitting node 101*a* is a User Equipment (UE) and the receiving node is a Base Station (BS). In another embodiment, the transmitting node 101*a* is a BS and the receiving node is a UE. In the network 100, the UE 101*a* establishes connection (also referred as Radio Resource Control (RRC) connection) with the BS 101*b* and performs communication with BS 101*b* over the established connection. In the uplink direction, the UE 101*a* transmits to the BS 101*b*. In the downlink direction, the BS 101*b* transmits to the UE 101*a*. One or more data radio bearers are established between the UE 101*a* and BS 101*b* for data communication. In the network 100 the UE 101 is a mobile phone, smart phone, smart watch, tablet, and the like. The network architecture, as well as the number of components of the network, as depicted in FIG. 1 is for illustration purpose only, and does not impose any restriction in terms of the structure, and number of components, or any related parameters.

The UE 101*a* is configured to receive data transfer requirement, from the network 100. In an embodiment, the transmitting node 101*a* receives a signaling parameter in radio resource control (RRC) signaling message indicating whether the large MAC SDU (or extension of length field in MAC subheader) is configured/supported or not. The network 100 can, during a Radio resource Control (RRC) signaling for connection setup or data radio bearer establishment, identify data transfer requirements, and signal the same, to the transmitting node 101*a*.

The transmitting node 101*a*, is configured to select a MAC subheader format to indicate the size of a MAC SDU or MAC control element from a plurality of MAC subheader formats, each MAC subheader format having a different size of length field, wherein the determination of MAC subheader format for said MAC SDU is done based on size of said MAC SDU or MAC control element and a signaling parameter in radio resource control (RRC) signaling message indicating whether the large MAC SDU (or extension of length field in MAC subheader) is configured/supported or not. Further, the transmitting node 101*a* encodes the length of MAC SDU in the selected subheader format, and transmits MAC carrying the said MAC SDU or MAC control element with MAC subheader to the to the receiving node 101*b*.

The receiving node 101*b* is configured to receive the MAC PDU from the transmitting node 101*a*, determine the MAC subheader format used and then determine size of MAC SDU or MAC Control Element (MAC CE), according to the subheader format being used by the transmitting node 101*a*.

Figure 2:
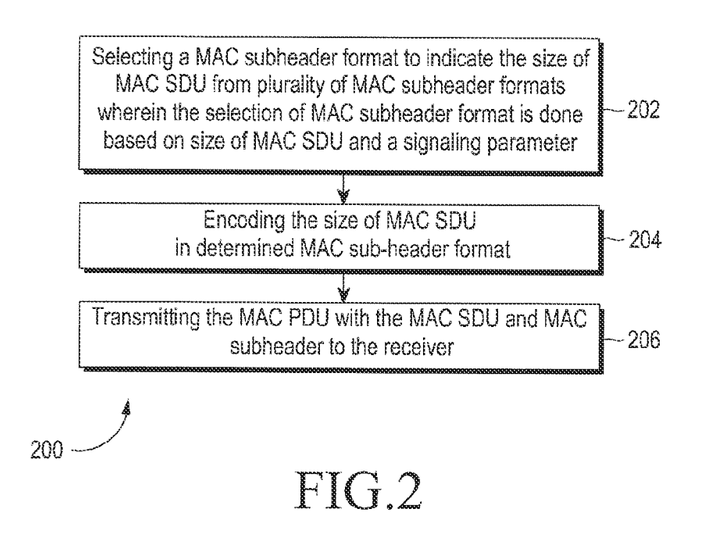
FIG. 2 is a flow diagram that depicts steps involved in an example process of transmitting protocol data unit by the transmitting node to the receiving node in the communication network according to this disclosure.

FIG. 2 is a flow diagram that depicts steps involved in an example process of transmitting protocol data unit by the transmitting node to the receiving node in the communication network according to this disclosure. The transmitting node 101*a* transmits one or more MAC SDU(s) to the receiving node 101*b*. Each MAC SDU is of different size. The amount of data to be transmitted in each MAC SDU is determined based on various scheduling algorithms in communication network and can be done by any standard procedure. For the purpose of explaining the concept, it is assumed that the MAC SDU or MAC control element is already generated in transmitting node 101*a* and needs to be transmitted to receiving node 101*b*. The transmitting node 101*a* indicates the size (such as an amount of data in unit of bytes or bits) of MAC SDU or MAC control element in a MAC subheader, wherein the MAC subheader and the corresponding MAC SDU or MAC control element are transmitted in a MAC PDU. One or more MAC SDUs or MAC control elements is transmitted in a MAC PDU wherein a MAC subheader is included for each of one or more MAC SDUs or MAC control elements.

The transmitting node 101*a* first selects (at step 202) a MAC subheader format to indicate the size of a MAC SDU or MAC CE from a plurality of MAC subheader formats, each MAC subheader format having a different size of length field, wherein the determination of MAC subheader format for said MAC SDU is done based on size of said MAC SDU and a signaling parameter in radio resource control (RRC) signaling message indicating whether the large MAC SDU (or extension of length field in MAC subheader) is configured/supported or not. The signaling parameter is indicated for each data radio bearer independently in RRC signaling message or the signaling parameter is applicable to all data radio bearers. The signaling parameter is a one bit value, wherein value 'one' indicates that large MAC SDU (or extension of length field in MAC subheader) is configured/supported and value 'zero' indicates that large MAC SDU (or extension of length field in MAC subheader) is not configured/supported. In another embodiment, presence of signaling parameter in RRC signaling indicates that large MAC SDU (or extension of length field in MAC subheader) is configured/supported, and absence of signaling parameter in RRC signaling indicates that large MAC SDU (or extension of length field in MAC subheader) is not configured/supported.

In order to select a MAC subheader format to indicate the size of MAC SDU or MAC control element from a plurality of MAC subheader formats, the transmitting node 101*a* first determines whether the size of MAC SDU or MAC control element to be transmitted to receiving node 101*b* is lesser than a threshold. The threshold is pre-defined in the system or configured by the network 100. The network 100 configures the threshold during connection setup between the transmitting node 101*a* and receiving node 101*b*. If the size of the MAC SDU or MAC control element to be transmitted to the receiving node 101*b* is lesser than the threshold, then the transmitting node 101*a* selects a first MAC subheader format. If the size of MAC SDU or MAC control element to be transmitted to receiving node 101*b* is not less than (such as greater than or equal to) the threshold, then the transmitting node 101*b* determines whether large MAC SDU (or extension of length field in MAC subheader) is configured/supported for transmitting one or more MAC SDU(s) or MAC control elements not.

The transmitting node 101*a* determines whether the large MAC SDU is configured for transmitting one or more MAC SDU(s) or MAC control element or not, based on value of the signaling parameter transmitted by network 100 in RRC signaling. If transmitting node 101*a* determines that the large MAC SDU (or extension of length field in MAC subheader) is configured/supported than transmitting node 101*a* selects a second MAC subheader format. If the large MAC SDU (or extension of length field in MAC subheader) is not configured/supported than transmitting node 101*a* selects a third MAC subheader format. The size of length field in first MAC subheader format is less than length field in third MAC subheader format. The size of length field in third MAC subheader format is less than length field in second MAC subheader format.

The transmitting node 101*a* then encodes (at step 204) the size of the MAC SDU or MAC control element in the selected MAC subheader format. Encoding size of MAC SDU or MAC control element in selected MAC subheader format comprises encoding size of said MAC SDU or MAC control element in one or more length fields in selected MAC subheader format, encoding one or more fields in selected MAC subheader which distinguishes the selected MAC subheader format from other MAC subheader formats. Other information such as logical channel identifier of logical channel associated with said MAC SDU or MAC control element is also encoded in selected MAC subheader format. The transmitting node 101*a* then transmits (at step 206) the MAC PDU carrying the said MAC SDU or MAC control element with MAC subheader to the receiver.

Figure 3A:
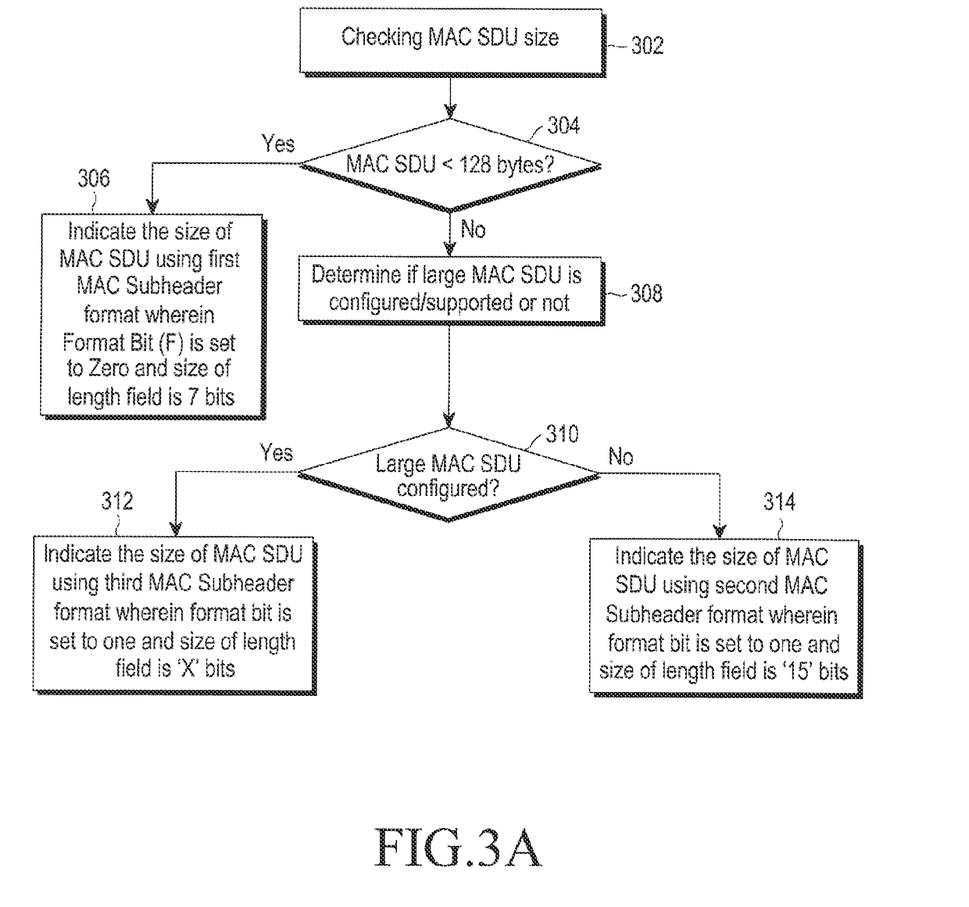
FIGS. 3A and 3B illustrate flow diagrams that depict example transmitter side operations and receiver side operations, respectively, according to this disclosure.
Figure 3B:
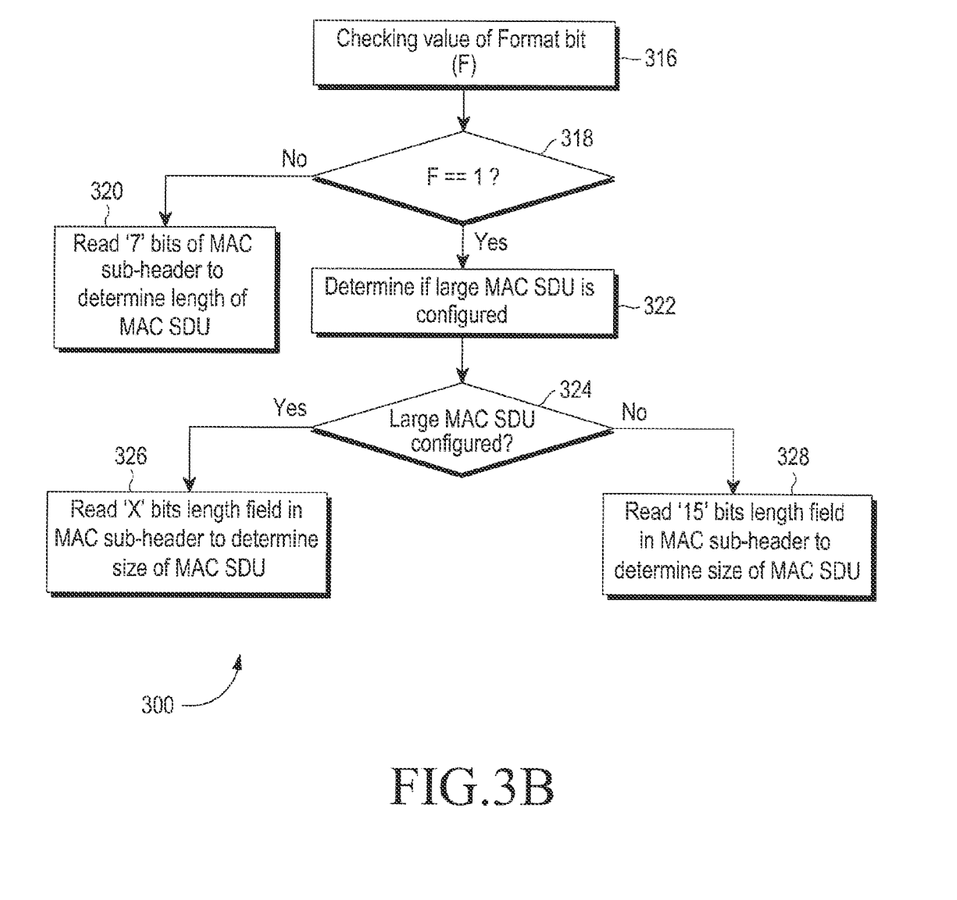

Various embodiments of the proposed invention that can be adopted by the transmitting and receiving nodes 101 to transmit and receive the protocol data unit are explained below:

In a first embodiment, the transmitting node 101*a* and the receiving node 101*b* transmit and receive the Protocol Data Unit (PDU) as follows: In this embodiment (as depicted in FIGS. 3A and 3B), if large MAC SDUs (or extension of length field in MAC subheader) needs to be supported, then the network 100, during the DRB creation or connection setup, signals the same to nodes 101. A signaling parameter in radio resource control (RRC) signaling message transmitted by network 100 indicates whether the large MAC SDU (or extension of length field in MAC subheader) is configured/supported or not. The RRC signaling message is an RRCConnectionReconfiguration message. In various embodiments, the signaling parameter is indicated for each data radio bearer independently in RRC signaling message, or is applicable to all data radio bearers. The signaling parameter is a one bit value, wherein value 'one' indicates that large MAC SDU (or extension of length field in MAC subheader) is configured/supported, and value 'zero' indicates that large MAC SDU (or extension of length field in MAC subheader) is not configured/supported. In another embodiment, presence of the signaling parameter in the RRC signaling indicates that large MAC SDU (or extension of length field in MAC subheader) is configured/supported, and the absence of the signaling parameter in RRC signaling indicates that large MAC SDU (or extension of length field in MAC subheader) is not configured/supported.

At the transmitting end (as depicted in FIG. 3A), the transmitting node 101a first checks (at step 302) the size of MAC SDU or MAC CE. If (at step 304) the size of MAC SDU or MAC CE is less than a threshold (such as 128 bytes), then the size of MAC SDU or MAC CE is indicated using a first MAC subheader format. The first MAC subheader format comprises of two reserved field of size one bit each, one extension bit field, 5 bit logical channel identifier field, one bit format bit filed and 7 bits length field. The Format Bit (F) is set (at step 306) to zero, and size of MAC SDU or MAC CE is indicated in 7 bits length field of MAC subheader format. The logical channel identifier for logical channel associated with MAC SDU or MAC CE is indicated using 5 bit logical channel identifier field.

If the size of the MAC SDU or MAC CE is not less than (such as greater than or equal to) the threshold (for example, 128 bytes), then the transmitting node 101a determines (at step 308) whether large MAC SDU (or extension of length field in MAC subheader) is configured/supported or not, that is determined based on the presence/absence or value of signaling parameter.

If (at step 310) the large MAC SDU (or extension of length field in MAC subheader) is not configured/supported, then a third MAC subheader formats selected and used to indicate the size of MAC SDU or MAC CE. The third MAC subheader format comprises of two reserved field of size one bit each, one extension bit field, 5 bit logical channel identifier field, one bit format bit filed and 15 bits length field. The Format Bit (F) is set (at step 312) to one, and size of the MAC SDU is indicated in 15 bits length field of MAC subheader format. The logical channel identifier for logical channel associated with MAC SDU or MAC CE is indicated using 5 bit logical channel identifier field. If large MAC SDU (or extension of length field in MAC subheader) is configured, then the size of MAC SDU or MAC CE is indicated using a second MAC subheader format. The second MAC subheader format comprises of two reserved field of size one bit each, one extension bit field, 5 bit logical channel identifier field, one bit format bit fled and X bits length field. In one embodiment size of length field in second MAC subheader format is 16 bits. The Format Bit (F) is set (at step 314) to one, and size of MAC SDU is indicated in 'X' bits length field, wherein the value of 'X' is predefined, or value of 'X' is signaled by network. The logical channel identifier for logical channel associated with MAC SDU is indicated using 5 bit logical channel identifier field.

In one embodiment, value of X is '15+N' wherein the value of 'N' is pre-defined or value of 'N' is signaled by network. In one embodiment, absolute value of 'N' is signaled. In another embodiment, various values of 'N' are indexed and index is signaled by network.

At the receiving end (as depicted in FIG. 3B), the receiving node 101b receives MAC PDU transmitted by the transmitting node 101a. The receiving node 101b (at step 316) checks the value of the format bit (F). If (at step 318) the value of F is equal to 0 in MAC subheader of received MAC PDU, then the receiving node identifies that MAC subheader is of first MAC subheader format wherein the length field in the MAC sub header is of 7 bits length, and reads (at step 320) 7 bits of length field in MAC sub header to determine length of MAC SDU. If value of F is 1, then the receiving node 101b determines (at step 322) if large MAC SDU (or extension of length field in MAC subheader) is configured/supported or not, based on at least one of a presence/absence or value of the signaling parameter. If (at step 324) large MAC SDU is configured/supported, then the receiving node 101b identifies that MAC subheader is of second mac header format wherein the length field in the MAC sub header is of X bits length and reads (at step 326) 'X' bit length field in MAC sub-header to determine size of MAC SDU. If large MAC SDU (or extension of length field in MAC subheader) is not configured/supported, then the receiving node 101b identifies that MAC subheader is of third mac header format wherein the length field in the MAC sub header is of 15 bits length and reads (at step 328) '15' bit length field in MAC sub-header to determine size of MAC SDU or MAC CE.

The various MAC subheader formats, criteria to select and encoding of fields in each of these formats by transmitter node in this embodiment are summarized in Table 1A.

| Signaling Parameter | Size of MAC SDU or MAC CE to be transmitted | MAC Subheader Format Fields |
|---|---|---|
| 0<br>Note: Absence of this parameter is also treated as '0' | <128 bytes | R1 (1 bit), R2(1 bit), E(1 bit), LCID(5 bit), F (1 bit) set to 0, Length (7 bit) |
| 0 | >=128 bytes | R1 (1 bit), R2(1 bit), E(1 bit), LCID(5 bit), F (1 bit) set to 1, Length (15 bit) |
| 1 | >=128 bytes | R1 (1 bit), R2(1 bit), E(1 bit), LCID(5 bit), F (1 bit) set to 1, Length (X bits) |

The criteria to determine the MAC subheader format and determine size of MAC SDU by receiver node is summarized in Table 1B.

| Signaling Parameter | Format bit Value | MAC SDU size determination |
|---|---|---|
| 0<br>Note: Absence of this parameter is also treated as '0' | 0 | Decode/parse the MAC subheader according to MAC subheader format with R1 (1 bit), R2 (1 bit), E (1 bit), LCID (5 bit), F (1 bit), Length (7 bit). Length indicates size of MAC SDU. |
| 0 | 1 | Decode/parse the MAC subheader according to MAC subheader format with R1 (1 bits), R2 (1 bit), E (1 bit), LCID (5 bit), F (1 bit), Length (15 bits). Length indicates size of MAC SDU. |

| Signaling Parameter | Format bit Value | MAC SDU size determination |
|---|---|---|
| 1 | 1 | Decode/parse the MAC subheader according to MAC subheader format with R1 (1 bit), R2 (1 bit), E (1 bit), LCID (5 bit), F (1 bit), Length (X bits). Length indicates size of MAC SDU. |

In another embodiment, the transmitting and receiving nodes 101 transmit and receive the protocol data unit as follows: In this method, if large MAC SDUs (or extension of length field in MAC subheader) needs to be supported, then the network 100, during the DRB creation or connection setup, signals the same to nodes 101. A signaling parameter in radio resource control (RRC) signaling message transmitted by network 100 indicates whether the large MAC SDU (or extension of length field in MAC subheader) is configured/supported or not. The RRC signaling message is an RRCConnectionReconfiguration message. The said signaling parameter is indicated for each data radio bearer independently in RRC signaling message or the signaling parameter is applicable to all data radio bearers. The signaling parameter is a one bit value, wherein value one indicates that large MAC SDU (or extension of length field in MAC subheader) is configured/supported and value zero indicates that large MAC SDU (or extension of length field in MAC subheader) is not configured/supported. Alternately, if signaling parameter is present in RRC signaling then the RRC signaling indicates that large MAC SDU (or extension of length field in MAC subheader) is configured/supported and absence of this parameter in RRC signaling indicates that large MAC SDU (or extension of length field in MAC subheader) is not configured/supported.

At the transmitting end, the transmitting node 101a first determines if Large MAC SDU (or extension of length field in MAC subheader) (is configured/supported or not. Accordingly, the transmitting node sets values of Format Bit and the length field in MAC subheader as mentioned below:

If large MAC SDU (or extension of length field in MAC subheader) is not configured/supported and size of MAC SDU or MAC CE is lesser than 128 bytes, then the size of MAC SDU or MAC CE is indicated using a MAC subheader format wherein the MAC subheader format comprises of two reserved field of size one bit each, one extension bit field, 5 bit logical channel identifier field, one bit format bit field and 7 bits length field. The Format Bit (F) is set to zero, and size of MAC SDU is indicated in 7 bits length field of MAC subheader format. The logical channel identifier for logical channel associated with MAC SDU or MAC CE is indicated using 5 bit logical channel identifier field. If large MAC SDU (or extension of length field in MAC subheader) is not configured/supported and size of MAC SDU or MAC CE is greater than equal to 128 bytes then the size of MAC SDU or MAC CE is indicated using a MAC subheader format wherein the MAC subheader format comprises of two reserved field of size one bit each, one extension bit field, 5 bit logical channel identifier field, one bit format bit filed and 15 bits length field. The Format Bit (F) is set to one, and size of MAC SDU is indicated in 15 bits length field of MAC subheader format. The logical channel identifier for logical channel associated with MAC SDU is indicated using 5 bit logical channel identifier field.

Figure 4A:
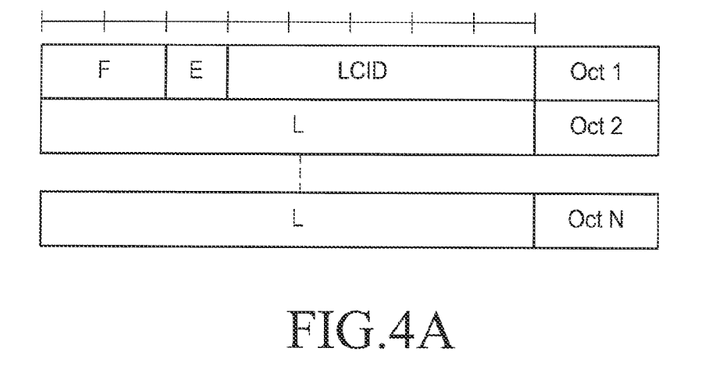
FIGS. 4A-4H illustrate different example frame formats of MAC sub-header, used for transmitting and receiving protocol data unit in the communication network, according to this disclosure.
Figure 4B:
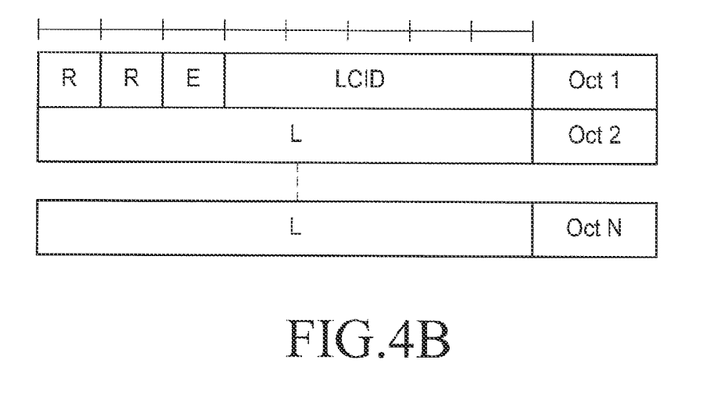
Figure 4C:
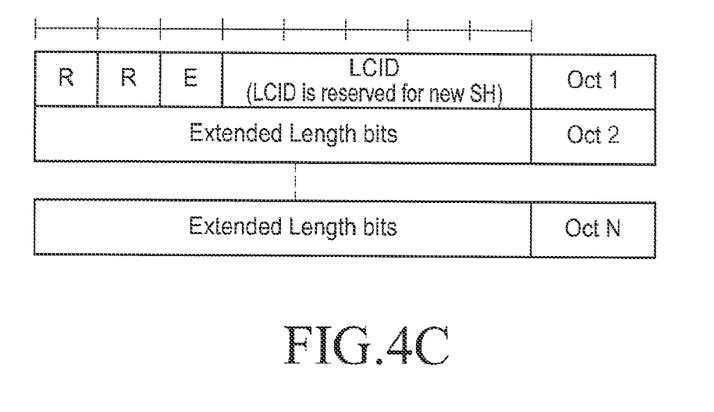
Figure 4D:
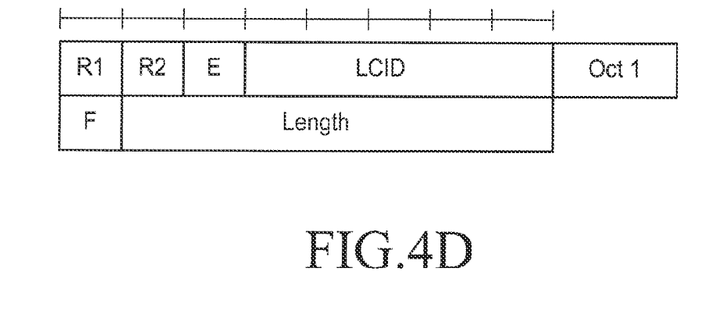
Figure 4E:
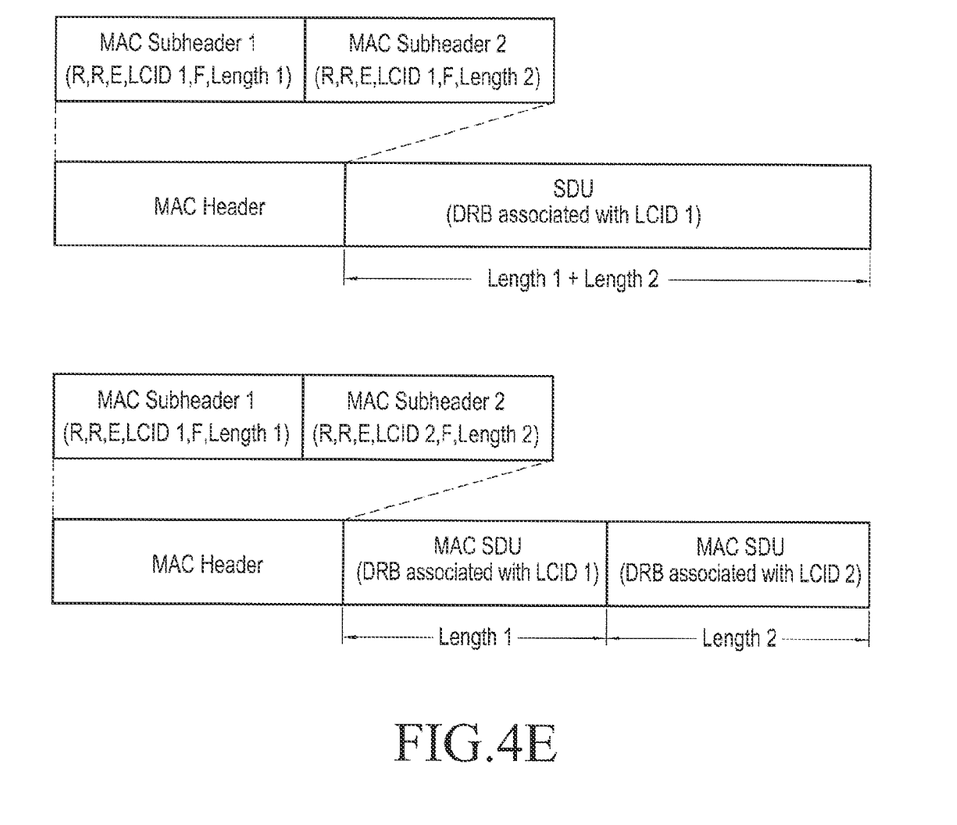
Figure 4F:
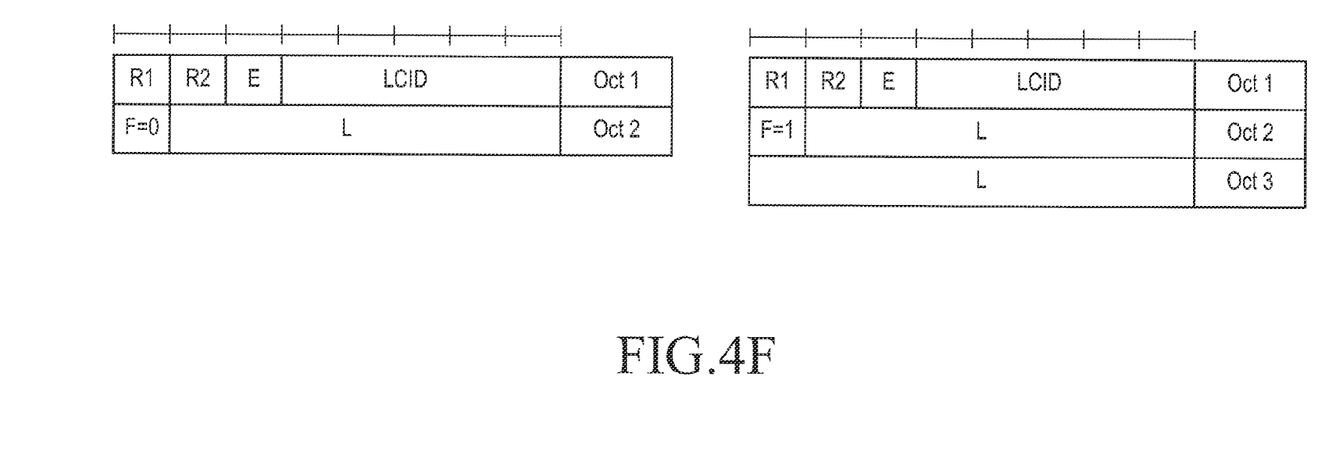
Figure 4G:
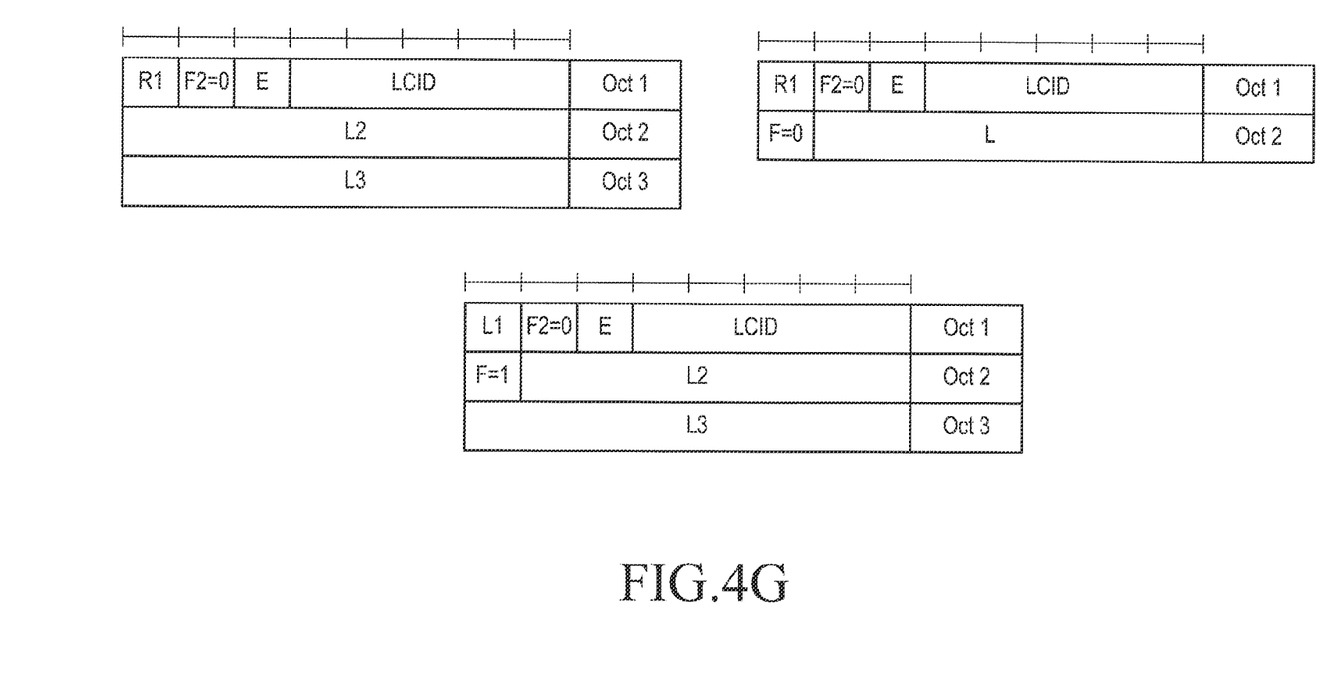
Figure 4H:
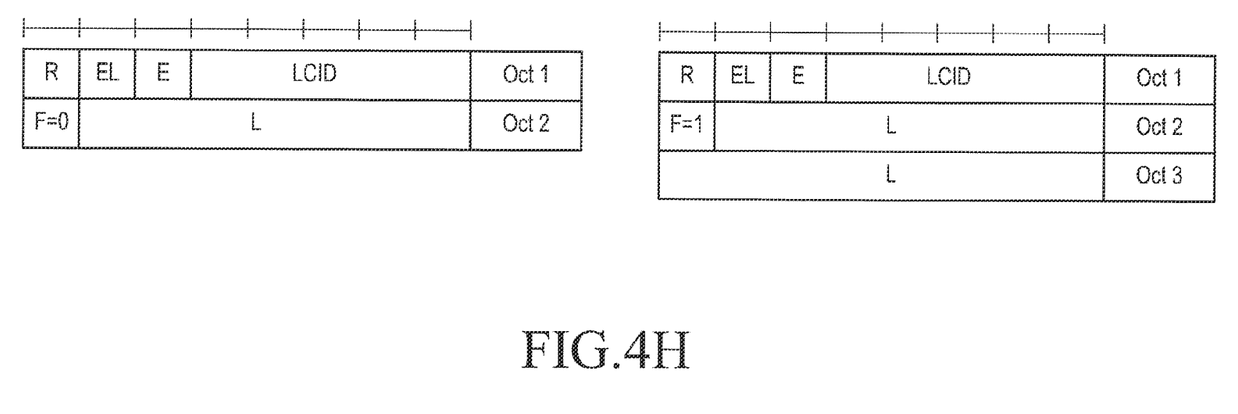

If large MAC SDU (or extension of length field in MAC subheader) is supported/configured and size of MAC SDU or MAC CE is lesser than 2(x) bytes, then the size of MAC SDU or MAC CE is indicated using a MAC subheader format wherein the MAC subheader format comprises of two reserved field of size one bit each, one extension bit field, 5 bit logical channel identifier field, one bit format bit filed and X bits length field. The Format Bit (F) is set to zero, and size of MAC SDU is indicated in X bits length field of MAC subheader format. The logical channel identifier for logical channel associated with MAC SDU is indicated using 5 bit logical channel identifier field. The value of 'X' is pre-defined or value of 'X' is signaled by network. In one embodiment, absolute value of 'X' is signaled. In another embodiment, various values of 'X' is indexed and index is signaled by network. In one embodiment X equals to 8. In one embodiment X bit length field is added in MAC subheader using two length fields L and EL (as shown in FIG. 4H) wherein some most significant bits of length are set in EL field and remaining bits in L field. The format bit is set to zero. In one embodiment EL is one bit and L is 7 bits.

If large MAC SDU (or extension of length field in MAC subheader) is supported/configured and size of MAC SDU or MAC CE is greater than equal to 2(x) bytes then the size of MAC SDU is indicated using a MAC subheader format wherein the MAC subheader format comprises of two reserved field of size one bit each, one extension bit field, 5 bit logical channel identifier field, one bit format bit filed and Y bits length field wherein the value of ' Y' is pre-defined or value of 'Y' is signaled by network. In one embodiment, absolute value of 'Y' is signaled. In another embodiment, various values of 'Y' are indexed and index is signaled by network. The Format Bit (F) is set to one, and size of MAC SDU is indicated in Y bits length field of MAC subheader format. In one embodiment Y equals to 16. The logical channel identifier for logical channel associated with MAC SDU is indicated using 5 bit logical channel identifier field. In one embodiment Y bit length field is added in MAC subheader using two length fields L and EL (as shown in FIG. 4H) wherein some most significant bits of length are set in EL field and remaining bits in L field. The format bit is set to one. In one embodiment EL is one bit and L is 15 bits.

In one embodiment, multiple sets of two length fields (X, Y) are there. Network signals which set is indicated by format field in MAC sub-header. At the receiving end, the receiving node 101b receives the MAC PDU transmitted by the transmitting node 101a, and checks if large MAC SDU (or extension of length field in MAC subheader) has been configured or not. If large MAC SDU (or extension of length field in MAC subheader) is not configured, then if Format bit F equal to zero in Mac sub-header of received MAC PDU, then the receiving node identifies that MAC subheader is of first MAC subheader format wherein the length field in the MAC sub header is of 7 bits length and reads '7' bit length field in MAC sub-header to determine size of MAC SDU, and if Format bit F equal to one in Mac sub-header of received MAC PDU, then the receiving node identifies that MAC subheader is of second MAC subheader format wherein the length field in the MAC sub header is of 15 bits length and reads 15 bit length field in MAC sub-header to determine size of MAC SDU. If large MAC SDU (or extension of length field in MAC subheader) has been configured, then if Format bit F equal to zero in Mac sub-header of received MAC PDU, then the receiving node identifies that MAC subheader is of third MAC subheader format wherein the length field in the MAC sub header is of X bits length and reads X bit length field in MAC sub-header to determine size of MAC SDU The value of 'X' is predefined or is signaled by the network 100. In one embodiment X is 8. In one embodiment receiver node reads the X bits of length using two length fields EL and L. Most significant bits are in EL and remaining bits in L field. If large MAC SDU (or extension of length field in MAC subheader) has been configured, then if Format bit F equal to one in Mac sub-header of received MAC PDU, then the receiving node identifies that MAC subheader is of fourth MAC subheader format wherein the length field in the MAC sub header is of Y bits length and reads Y bit length field in MAC sub-header to determine size of MAC SDU. The value of 'Y' is pre-defined or is signaled by the network 100. In one embodiment Y is 16. In one embodiment receiver node reads the Y bit of length using two length fields EL and L. Most significant bits are in EL and remaining bits in L field.

In another embodiment, the transmitting and receiving nodes 101 transmit and receive the protocol data unit as follows: In this method, a new MAC sub-header format (as depicted in FIG. 4A) is proposed. The new MAC sub-header is defined such that Logical Channel ID (LCID) location is same in the new as well as in legacy MAC sub-header. In this embodiment of the proposed invention, if large MAC SDUs needs to be supported, then the network 100, during the DRB creation or connection setup, signals the same to nodes 101. A signaling parameter in radio resource control (RRC) signaling message transmitted by network 100 indicates whether the large MAC SDU (or extension of length field in MAC subheader) is configured/supported or not. The RRC signaling message is an RRCConnectionReconfiguration message. The said signaling parameter is indicated for each data radio bearer independently in RRC signaling message or the signaling parameter is applicable to all data radio bearers. The signaling parameter is a one bit value, wherein value one indicates that large MAC SDU (or extension of length field in MAC subheader) is configured/supported and value zero indicates that large MAC SDU (or extension of length field in MAC subheader) is not configured/supported. Alternately, if signaling parameter is present in RRC signaling then the RRC signaling indicates that large MAC SDU (or extension of length field in MAC subheader) is configured/supported and absence of this parameter in RRC signaling indicates that large MAC SDU (or extension of length field in MAC subheader) is not configured/supported. If large MAC SDU or length field extension in MAC subheader is not indicated in signaling by the network 100, then legacy MAC sub-header (such as MAC subheader formats with 7 and 15 bit length fields) is used. If large MAC SDU or length field extension in MAC subheader is indicated in signaling by network 100, then this new MAC sub-header is used. In this embodiment, using the two bit format field of new MAC subheader, up to four different sizes of length field can be indicated. In one embodiment some bits are reserved for future extension. In one embodiment the sizes indicated by format field are fixed. In another embodiment the sizes indicated by format field are configurable.

In another embodiment, the transmitting and receiving nodes 101 transmit and receive the protocol data unit as follows: In this method a new MAC sub-header format (as depicted in FIG. 4B) is proposed. The new MAC sub-header is defined such that LCID location is same in new and legacy MAC sub-header. The size of length field can be fixed or configured by network. In this embodiment of the proposed invention, if large MAC SDUs needs to be supported, then the network 100, during the DRB creation or connection setup, signals the same to nodes 101. A signaling parameter in radio resource control (RRC) signaling message transmitted by network 100 indicates whether the large MAC SDU (or extension of length field in MAC subheader) is configured/supported or not. The RRC signaling message is an RRCConnectionReconfiguration message. The said signaling parameter is indicated for each data radio bearer independently in RRC signaling message or the signaling parameter is applicable to all data radio bearers. The signaling parameter is a one bit value, wherein value one indicates that large MAC SDU (or extension of length field in MAC subheader) is configured/supported and value zero indicates that large MAC SDU (or extension of length field in MAC subheader) is not configured/supported. Alternately, if signaling parameter is present in RRC signaling then the RRC signaling indicates that large MAC SDU is configured/supported and absence of this parameter in RRC signaling indicates that large MAC SDU is not configured/supported. If large MAC SDU or length field extension in MAC subheader is not indicated in signaling by network then legacy MAC sub-header is used. If large MAC SDU or length field extension in MAC subheader is indicated in signaling by network then this new MAC sub-header is used.

In another embodiment, the transmitting and receiving nodes 101 transmit and receive the protocol data unit as follows: In this method, a new MAC sub-header format (as depicted in FIG. 4C). If the length of MAC SDU or MAC CE is longer than length that is indicated using legacy MAC sub-header, then the transmitting node 101a transmits two MAC sub headers in MAC PDU for a single MAC SDU or MAC CE, wherein the new sub-header follows the legacy sub-header. The most significant bits (or least significant bits) of length are carried in legacy sub-header and least significant bits (or most significant bits) are carried in this new sub-header. The LCID in the legacy sub-header is the LCD of logical channel associated with DRB whereas LCID in new sub-header is a reserved LCID which is reserved specifically for this new sub header. The number of extended length bits in this new MAC sub-header is predefined, or is configured at the time of DRB establishment by network. In another embodiment, a format bit is included in this new MAC sub-header to indicate various sizes of extension bits. In another embodiment, multiple MAC sub-headers with extension bits are added.

In another embodiment, the transmitting and receiving nodes 101 transmit and receive the protocol data unit as follows: In this method, if large MAC SDUs needs to be supported, then the network 100, during the DRB creation or connection setup, signals the same to nodes 101. A signaling parameter in radio resource control (RRC) signaling message transmitted by network 100 indicates whether the large MAC SDU (or extension of length field in MAC subheader) is configured/supported or not. The RRC signaling message is an RRCConnectionReconfiguration message. The said signaling parameter is indicated for each data radio bearer independently in RRC signaling message or the signaling parameter is applicable to all data radio bearers. The signaling parameter is a one bit value, wherein value one indicates that large MAC SDU (or extension of length field in MAC subheader) is configured and value zero indicates that large MAC SDU (or extension of length field in MAC subheader) is not configured/supported. Alternately, if signaling parameter is present in RRC signaling then the RRC signaling indicates that large MAC SDU (or extension of length field in MAC subheader) is configured/supported and absence of this parameter in RRC signaling indicates that large MAC SDU (or extension of length field in MAC subheader) is not configured/supported. If large MAC SDU or length field extension in MAC subheader is not indicated in signaling by network then legacy MAC sub-header is used. If large MAC SDU or length field extension in MAC subheader is indicated then both F and R1 (or R2) bits in the legacy MAC sub-header are used to indicate the size of length field in the MAC sub-header (as depicted in FIG. 4D). In this method, the size of length field in MAC subheader is determined as follows:

If F==0 then the length field indicates 7 bits length field else

If F==1 && R1 (or R2)==0 then the length field indicates 15 bits length field else If F==1 && R1 (or R2)==1 then the length field indicates 'X' bits length field wherein 'X' is pre-defined or 'X'=15+'N' wherein 'N' is pre-defined. In one embodiment 'N' is signaled by network.

The transmitting node 101a determines the size of MAC SDU and if size is lesser than 128 bytes then the transmitting node 101a sets F equals zero in MAC subheader and encodes the size of MAC SDU in 7 bit length field. If size of MAC SDU is greater than or equal to 128 bytes but lesser than 32768 then the transmitting node 101a sets F equals to one, R1 (or R2) equals to zero and encodes the size of MAC SDU in 15 bits length field. If size of MAC SDU is greater than or equal to 32768 bytes then the transmitting node 101a sets F equals to one, R1 (or R2) equals to one and encode the size of MAC SDU in X bits length field. X is 16 bits in one implementation.

In another embodiment, the transmitting and receiving nodes 101 transmit and receive the protocol data unit as follows: In this method, if large MAC SDUs needs to be supported, then the network 100, during the DRB creation, signals the same to nodes 101. A signaling parameter in radio resource control (RRC) signaling message transmitted by network 100 indicates whether the large MAC SDU (extension of length field in MAC subheader) is configured/supported or not. The RRC signaling message is an RRC-ConectionReconfiguration message. The said signaling parameter is indicated for each data radio bearer independently in RRC signaling message or the signaling parameter is applicable to all data radio bearers. The signaling parameter is a one bit value, wherein value one indicates that large MAC SDU (or extension of length field in MAC subheader) is configured and value zero indicates that large MAC SDU (or extension of length field in MAC subheader) is not configured/supported. Alternately, if signaling parameter is present in RRC signaling then the RRC signaling indicates that large MAC SDU (or extension of length field in MAC subheader) is configured/supported and absence of this parameter in RRC signaling indicates that large MAC SDU (or extension of length field in MAC subheader) is not configured/supported. If large MAC SDN or length field extension in MAC subheader is not indicated in signaling by network then legacy MAC sub-header is used. If large MAC SDU or length field extension in MAC subheader is indicated then in this embodiment both F and R1, R2 bits in the legacy MAC sub-header are used to indicate the size of length field in the MAC sub-header (as depicted in FIG. 4D). In this method, the size of length field in MAC subheader is determined as follows:

If F==0 then the length field indicates 7 bits length field.

If F==1 && R1R2==00 then the length field indicates 15 bits length field

If F==1 && R1R2==01 then the length field indicates 'X' bits length field

If F==1 && R1R2==10 then the length field indicates 'Y' bits length field

If F==1 && R1R2==11 then the length field indicates 'Z' bits length field

'X', ' Y' and 'Z' are pre-defined

The transmitting node 101a determines the size of MAC SDU and accordingly encodes the size of length field, F, R1R2 bits in the MAC subheader.

In another embodiment, the transmitting and receiving nodes 101 transmit and receive the protocol data unit as follows: In this method, if large MAC SDUs needs to be supported, then the network 100, during the DRB creation or connection setup, signals the same to nodes 101. A signaling parameter in radio resource control (RRC) signaling message transmitted by network 100 indicates whether the large MAC SDU (extension of length field in MAC subheader) is configured/supported or not. The RRC signaling message is an RRCConnectionReconfiguration message. The said signaling parameter is indicated for each data radio bearer independently in RRC signaling message or the signaling parameter is applicable to all data radio bearers. The signaling parameter is a one bit value, wherein value one indicates that large MAC SDU (or extension of length field in MAC subheader) is configured and value zero indicates that large MAC SDU (or extension of length field in MAC subheader) is not configured/supported. Alternately, if signaling parameter is present in RRC signaling then the RRC signaling indicates that large MAC SDU (or extension of length field in MAC subheader) is configured/supported and absence of this parameter in RRC signaling indicates that large MAC SDU (or extension of length field in MAC subheader) is not configured/supported. If large MAC SDU or length field extension in MAC subheader is not indicated in signaling by network then legacy MAC sub-header is used. If large MAC SDU or length field extension in MAC subheader is indicated in signaling by network then, two MAC sub headers for same LCID for one MAC SDU is sent (as depicted in FIG. 4E). The length of MAC SDU is combined length in both sub headers, wherein, L1: MSBs of length; L2: LSBs of length and L1 and L2 indicated in first and second sub-header respectively or vice versa. Alternately the length L of MAC, SDU equals=value of length field in first sub-header+value of length field in second sub-header. The network 100 configures this method during DRB establishment or connection establishment.

In another embodiment, the transmitting and receiving nodes 101 transmit and receive the protocol data unit as follows: In this method, if large MAC SDUs needs to be supported, then the network 100, during the DRB creation or connection setup, signals the same to nodes 101. A signaling parameter in radio resource control (RRC) signaling message transmitted by network 100 indicates whether the large MAC SDU (extension of length field in MAC subheader) is configured/supported or not. The RRC signaling message is an RRCConnectionReconfiguration message. The said signaling parameter is indicated for each data radio bearer independently in RRC signaling message or the signaling parameter is applicable to all data radio bearers. The signaling parameter is a one bit value, wherein value one indicates that large MAC SDU (or extension of length field in MAC subheader) is configured and value zero indicates that large MAC SDU (or extension of length field in MAC subheader) is not configured/supported. Alternately, if signaling parameter is present in RRC signaling then the RRC signaling indicates that large MAC SDU (or extension of length field in MAC subheader) is configured/supported and absence of this parameter in RRC signaling indicates that large MAC SDU (or extension of length field in MAC subheader) is not configured/supported. If large MAC SDU or length field extension in MAC subheader is not indicated in signaling by network then legacy MAC sub-header is used. In this embodiment, a new MAC sub-header is defined (as depicted in FIG. 4F). The new MAC sub-header is defined such that LCID location is same in new and legacy MAC sub-header. In this method, if large MAC SDU or length field extension in MAC subheader is not configured in signaling by network then legacy MAC sub-header is used wherein F=1 indicates 15 bit length field and F=0 indicates 7 bit length field. If large MAC SDU or length field extension in MAC subheader is indicated/configured in signaling by network then this new MAC sub-header (FIG. 4F) is used wherein F=0 indicates 7 bit length field and F=1 indicates 16 bit length. The 15 LSBs of 16 bit length field is encoded in L field following the F field. The MSB of 16 bit length field is encoded in EL field of MAC subheader. EL field is present in first or second bit of MAC sub-header. The transmitting node 101a determines the size of MAC SDU and if MAC SDU size is lesser than equal to 128 bytes, then F bit in MAC subheader is set to zero and size of MAC SDU is encoded in 7 bit length field. If size of MAC SDU is greater than or equal to 128 bytes and large MAC SDU or length field extension in MAC subheader is configured/supported indication is received in signaling from network then F is set to one and size of MAC SDU is encoded in L and EL field of MAC subheader.

Alternately, if large MAC SDU or length field extension in MAC subheader is indicated in signaling by network 100, then this new MAC sub-header (FIG. 4H) is used wherein F=0 indicates 8 bit length field and F=1 indicates 16 bit length. If equals to one, then 15 LSBs of 16 bit length field is encoded in L field following the F field. The MSB of 16 bit length field is encoded in EL field of MAC subheader. EL field is present in first or second bit of MAC sub-header. If F equals to zero, then 7 LSBs of 8 bit length field is encoded in L field following the F field. The MSB of 8 bit length field is encoded in EL field of MAC subheader. EL field is present in first or second bit of MAC sub-header.

If large MAC SDU or length field extension in MAC subheader (such as extendedLength) is not configured by higher layer and the size of the MAC SDU or variable-sized MAC control element is less than 128 byte, F field is set to 0. If large MAC SDU or length field extension in MAC subheader (such as extendedLength) is configured by higher layer and the size of the MAC SDU or variable-sized MAC control element is less than 256 byte, F field is set to 0. Otherwise, the F field is set to one.

If large MAC SDU or length field extension in MAC subheader (such as extendedLength) is configured by higher layers, the L field is extended with the EL field of the corresponding MAC subheader. The EL-field is added as the most significant bit for the Length field.

The Extended Length (EL) field is used for L field extension bit, if configured by higher layers. If extended L field is not configured by higher layers, the EL field is set to "0".

In another embodiment, the transmitting and receiving nodes 101 transmit and receive the protocol data unit as follows: In this embodiment, if large MAC SDUs needs to be supported, then the network 100, during the DRB creation or connection setup, signals the same to nodes 101. A signaling parameter in radio resource control (RRC) signaling message transmitted by network 100 indicates whether the large MAC SDU (extension of length field in MAC subheader) is configured/supported or not. The RRC signaling message is an RRCConnectionReconfiguration message. The signaling parameter is indicated for each data radio bearer independently in RRC signaling message or the signaling parameter is applicable to all data radio bearers. The signaling parameter is a one bit value, wherein value one indicates that large MAC SDU (or extension of length field in MAC subheader) is configured/supported and value zero indicates that large MAC SDU (or extension of length field in MAC subheader) is not configured/supported. Alternately, if signaling parameter is present in RRC signaling then the RRC signaling indicates that large MAC SDU (or extension of length field in MAC subheader) is configured/supported and absence of this parameter in RRC signaling indicates that large MAC SDU (or extension of length field in MAC subheader) is not configured/supported. If large MAC SDU or length field extension in MAC subheader is not indicated in signaling by network then legacy MAC sub-header is used. Otherwise, in this embodiment, a new MAC sub-header is defined (as depicted in FIG. 4G). The new MAC sub-header is defined such that LCID location is same in new and legacy MAC sub-header. If the size of the MAC SDU or variable-sized MAC control element is larger than 32768 bytes, the value of the field is set to 1; otherwise, the field is set to 0. If the F2 field is set to 0, then F field above is used to indicates the size of the Length field between 7 bits and 15 bits, and if F2 field is set to 1, F field does not exist; In this MAC sub-header, F2 equals one indicates that 16 bit length field follows the LCID field in MAC sub-header.

The various actions in method 300 can be performed in the order presented, in a different order or simultaneously. Further, in some embodiments, some actions listed in FIG. 3 may be omitted.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiments disclosed herein specify a mechanism for synchronizing communication between transmitting and receiving nodes in a communication network. The mechanism allows synchronized encryption and decryption of data, providing a system thereof. Therefore, it is understood that the scope of protection is extended to such a system and by extension, to a computer readable means having a message therein, said computer readable means containing a program code for implementation of one or more steps of the method, when the program runs on a server or mobile device or any suitable programmable device. The method is implemented in a preferred embodiment using the system together with a software program written in, for ex. Very high speed integrated circuit Hardware Description Language (VHDL), another programming language, or implemented by one or more VHDL or several software modules being executed on at least one hardware device. The hardware device can be any kind of device which can be programmed including, for ex. any kind of a computer like a server or a personal computer, or the like, or any combination thereof, for ex. one processor and two FPGAs. The device may also include means which could be for ex. hardware means like an ASIC or a combination of hardware and software means, an ASIC and an FPGA, or at least one microprocessor and at least one memory with software modules located therein. Thus, the means are at least one hardware means or at least one hardware-cum-software means. The method embodiments described herein could be implemented in pure hardware or partly in hardware and partly in software. Alternatively, the embodiment may be implemented on different hardware devices, for ex. using a plurality of CPUs.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for data transmission, by a transmitting node, in a communication network, the method comprising:
   generating a medium access control (MAC) protocol data unit (PDU), comprising a MAC service data unit (SDU) and a subheader; and
   transmitting the MAC PDU,
   wherein the subheader corresponds to the MAC SDU,
   wherein the subheader comprises a format indicator field and a length field comprising a plurality of bits,
   wherein the plurality of bits indicate a length of the MAC SDU and are continuous in the MAC PDU,
   wherein the subheader is placed in front of the MAC SDU in the MAC PDU,
   wherein a value of the format indicator field indicates a size of the length field,
   wherein when the value of the format indicator field is set to one, the value of the format indicator field indicates that the size of the length field is 16 bits, and
   wherein when the value of the format indicator field is set to zero, the value of the format indicator field indicates that the size of the length field is 8 bits.

2. The method of claim 1, wherein the subheader further comprises a reserved field and a logical channel identifier (LCD) field.

3. The method of claim 2, wherein the LCID field identifies a logical channel associated with the MAC SDU.

4. A transmitting node for data transmission in a communication network, the transmitting node comprising:
   a transceiver configured to transmit or receive data; and
   at least one processor configured to:
   generate a medium access control (MAC) protocol data unit (PDU), comprising a MAC service data unit (SDU) and a subheader, and
   transmit the MAC PDU via the transceiver,
   wherein the subheader corresponds to the MAC SDU,
   wherein the subheader comprises a format indicator field and a length field comprising a plurality of bits,
   wherein the plurality of bits indicate a length of the MAC SDU and are continuous in the MAC PDU,
   wherein the subheader is placed in front of the MAC SDU in the MAC PDU,
   wherein a value of the format indicator field indicates a size of the length field,
   wherein when the value of the format indicator field is set to one, the value of the format indicator field indicates that the size of the length field is 16 bits, and
   wherein when the value of the format indicator field is set to zero, the value of the format indicator field indicates that the size of the length field is 8 bits.

5. The transmitting node of claim 4, wherein the subheader further comprises a reserved field and a logical channel identifier (LCD) field.

6. The transmitting node of claim 5, wherein the LCID field identifies a logical channel associated with the MAC SDU.

7. A method for data reception, by a receiving node, in a communication network, the method comprising:
   receiving a medium access control (MAC) protocol data unit (PDU), comprising a MAC service data unit (SDU) and a subheader; and
   identifying the subheader in the MAC PDU,
   wherein the subheader corresponds to the MAC SDU,
   wherein the subheader comprises a format indicator field and a length field comprising a plurality of bits,
   wherein the plurality of bits indicate a length of the MAC SDU and are continuous in the MAC PDU,
   wherein the subheader is placed in front of the MAC SDU in the MAC PDU,
   wherein a value of the format indicator field indicates a size of the length field,
   wherein when the value of the format indicator field is set to one, the value of the format indicator field indicates that the size of the length field is 16 bits, and
   wherein when the value of the format indicator field is set to zero, the value of the format indicator field indicates that the size of the length field is 8 bits.

8. The method of claim 7, wherein the subheader further comprises a reserved field and a logical channel identifier (LCD) field.

9. The method of claim 8, wherein the LCID field identifies a logical channel associated with the MAC SDU.

10. A receiving node for data reception in a communication network, the receiving node comprising:
    a transceiver configured to transmit or receive data; and
    at least one processor configured to:
    receive, via the transceiver, a medium access control (MAC) protocol data unit (PDU), comprising a MAC service data unit (SDU) and a subheader, and
    identify the subheader in the MAC PDU,
    wherein the subheader corresponds to the MAC SDU,
    wherein the subheader comprises a format indicator field and a length field comprising a plurality of bits,
    wherein the plurality of bits indicate a length of the MAC SDU and are continuous in the MAC PDU,
    wherein the subheader is placed in front of the MAC SDU in the MAC PDU, and
    wherein a value of the format indicator field indicates a size of the length field,
    wherein when the value of the format indicator field is set to one, the value of the format indicator field indicates that the size of the length field is 16 bits, and
    wherein when the value of the format indicator field is set to zero, the value of the format indicator field indicates that the size of the length field is 8 bits.

11. The receiving node of claim 10, wherein the subheader further comprises a reserved field and a logical channel identifier (LCID) field.

12. The receiving node of claim 11, wherein the LCID field identifies a logical channel associated with the MAC SDU.

* * * * *